United States Patent [19]
Williamson

[11] 3,882,679
[45] May 13, 1975

[54] CONTROL FOR DUAL PATH HYDROSTATIC DRIVE

[75] Inventor: William Aplin Williamson, Niles, Mich.

[73] Assignee: Clark Equipment Company, Buchanan, Mich.

[22] Filed: Feb. 28, 1974

[21] Appl. No.: 446,998

[52] U.S. Cl.................. 60/484; 60/486; 74/471 R; 180/6.48; 417/426; 60/420
[51] Int. Cl.............................................. F16h 39/46
[58] Field of Search............ 60/420, 428, 486, 484; 74/471 R; 180/6.48; 417/426

[56] References Cited
UNITED STATES PATENTS

| | | | |
|---|---|---|---|
| 2,941,609 | 6/1960 | Bowers et al. | 180/6.48 |
| 3,181,389 | 5/1965 | Richard | 180/6.48 |
| 3,611,827 | 10/1971 | Bottum et al. | 180/6.48 |

Primary Examiner—Edgar W. Geoghegan
Attorney, Agent, or Firm—Kenneth C. Witt

[57] ABSTRACT

A control for a hydrostatic drive system which has two variable displacement swash plate type pumps connected individually in circuit with two motors. A single vertically disposed control lever is pivotable about a horizontally disposed axis and also is pivotable about its own vertically disposed axis. A transverse portion is rigidly secured to the control lever and extends outwardly from it. A pair of operating rods are connected between the transverse portion and the swash plates of the pumps respectively. A pair of hydraulic power assist devices are mechanically connected to the swash plates respectively. Each of the power assist devices has hydraulic connections to the inlet and outlet of its respective pump which is additive to the force applied by the respective operating rod.

9 Claims, 4 Drawing Figures

PATENTED MAY 13 1975　　3,882,679

CONTROL FOR DUAL PATH HYDROSTATIC DRIVE

BACKGROUND OF THE INVENTION

1. Field of the Invention

This invention relates to control mechanisms for hydrostatic drives, and more particularly to a single lever control for a dual path hydrostatic drive which has two variable displacement swash plate type pumps connected individually to operate two hydraulic motors, with the control mechanism providing a power assist so that it is possible readily for the operator to control speed, direction, turning and stopping with a single lever.

2. Description of the Prior Art

It is known that a versatile drive system can be provided for a vehicle by utilizing two variable displacement pumps each connected to drive individually one of the two motors which also form a part of the hydrostatic drive system. A single engine may be utilized to drive the two pumps, with the motors in turn driving two wheels of a vehicle. With proper controls such a vehicle, while being controlled entirely by controlling the pumps can be caused to move forward at a desired speed, rearwardly at a desired speed, turn in either direction, stop, and in a proper case, such as with a three wheel vehicle, execute a pivot turn.

It is the object of the present invention to provide a single lever control mechanism by which the operator of a vehicle equipped with such a hydrostatic drive system can readily perform all of the mentioned functions by manipulating a single control lever.

SUMMARY OF THE INVENTION

In carrying out my invention in one preferred form I provide a control mechanism for a dual path hydrostatic drive system which has two variable displacement swash plate type pumps connected individually in circuit with and arranged to drive two motors. The control mechanism includes a single vertically disposed control lever which is pivotable about a horizontally disposed axis and which is also pivotable about its own vertically disposed axis. A transverse portion is rigidly secured to the control lever and extends outwardly from the lever. A pair of operating rods are connected between the transverse portion and the swash plate of the pumps respectively. A pair of hydraulic power assist devices are mechanically connected to the swash plates respectively, and each of the power assist devices also has hydraulic connections to the inletoutlet ports of its respective pump. These power assist devices are arranged to apply forces to the swash plates of their respective pumps which are additive to the forces applied by the respective operating rods.

DESCRIPTION OF THE PREFERRED EMBODIMENT

Figure 1:
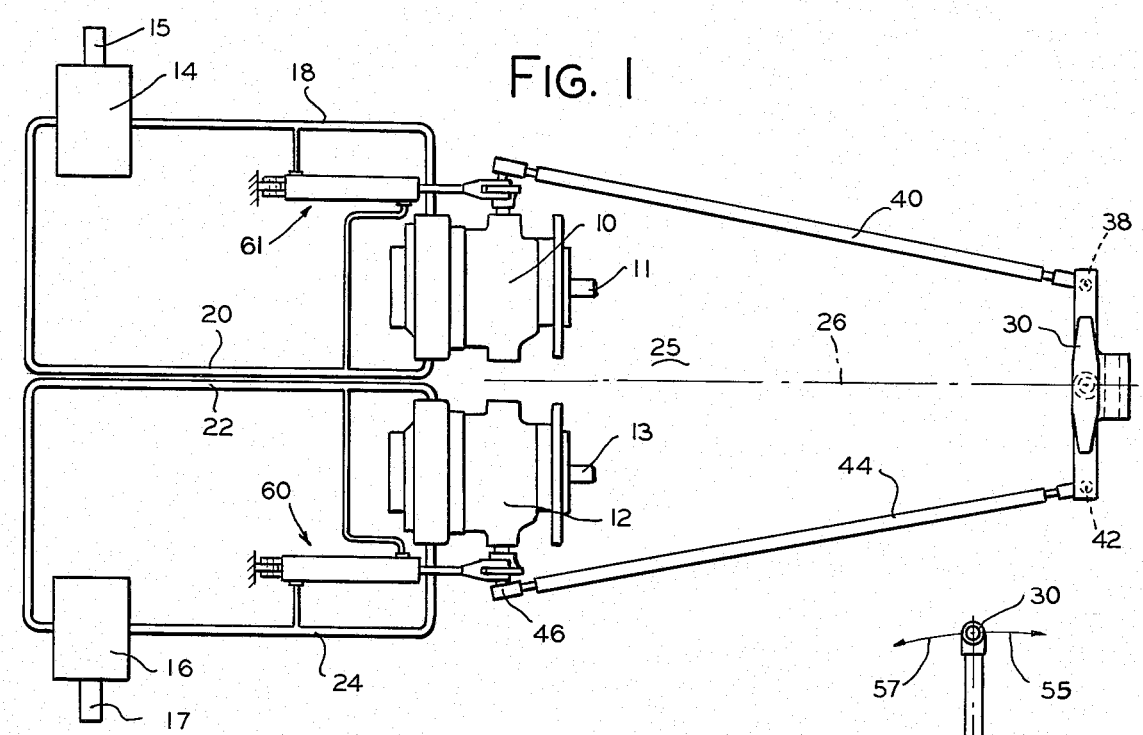
FIG. 1 is a schematic top plan view of the hydrostatic drive system embodying the control mechanism of the present invention.

Referring to FIG. 1 there is shown a dual path hydrostatic drive system which includes two pumps indicated generally by the numerals 10 and 12 respectively and two motors indicated by the numerals 14 and 16. As shown, both of the pumps are of the axial piston swash plate variable displacement type while the motors may be of the fixed displacement type although the invention is not limited to such motors. Pump 10 operates motor 14 by means of a pair of high pressure hydraulic connections 18 and 20. Similarly, pump 12 operates motor 16 by means of similar high pressure connecting hydraulic conduits 22 and 24.

Pumps 10 and 12 preferably are driven by a single engine or other suitable prime mover connected to the pumps at shafts 11 and 13 respectively. The motors 14 and 16 may operate the wheels of a vehicle which are connected to the shafts 15 and 17 of the respective motors.

It will be appreciated by those skilled in the art that as the pump 10 is operated by the engine, and as the swash plate of the pump 10 is moved away from its neutral position pressurized fluid flows through conduit 18 and through the motor 14 and back through the conduit 20 to the pump 10 for recirculation. This operates the motor in one direction. If the swash plate of the pump 10 is moved in the other direction from neutral the flow of pressurized fluid through the conduits 20 and 18 is reversed as is the direction of the motor 14. The speed of motor 14 is determined by the extent of displacement of the swash plate of pump 10 from the neutral position, an infinitely variable speed being available as the swash plate moves from the neutral position to its maximum operating position in either direction.

The pump 12 operates motor 16 in a similar manner by directing pressurized fluid through the motor, through conduits 22 and 24. The combination of the two pumps and two motors a dual path hydrostatic drive system or hydrostatic transmission which is indicated generally by the numeral 25. It will be appreciated that as shown the two pumps and two motors are reversed in position and arrangement and are positioned symmetrically about a centerline indicated at 26, although it will be appreciated that it is possible to modify the physical arrangement if desired, by suitable proportioning of the size and location of the various parts of the hydrostatic drive system.

The dual path hydrostatic drive system is operated by a control mechanism which is indicated generally by the numeral 27 and which includes a vertically disposed control lever 28 which has located at the top a transverse handle 30 for use by the operator in carrying out turning movements. The control lever 28 is mounted for pivotal movement about a transverse horizontal axis 32, and as shown, the lever 28 is located in a bearing member 34, being arranged to pivot within bearing member 34 about its own longitudinal vertical axis 29 for a purpose described hereinafter.

A transverse portion or member 36 is secured rigidly at the bottom of lever 28 and extends to either side of the longitudinal axis 29 in this embodiment of the invention. Portion 36 has a universal connection indicated at 38 for an operating rod 40 for the pump 10 and another universal connection at 42 for the operating rod 44 for pump 12.

Figure 2:
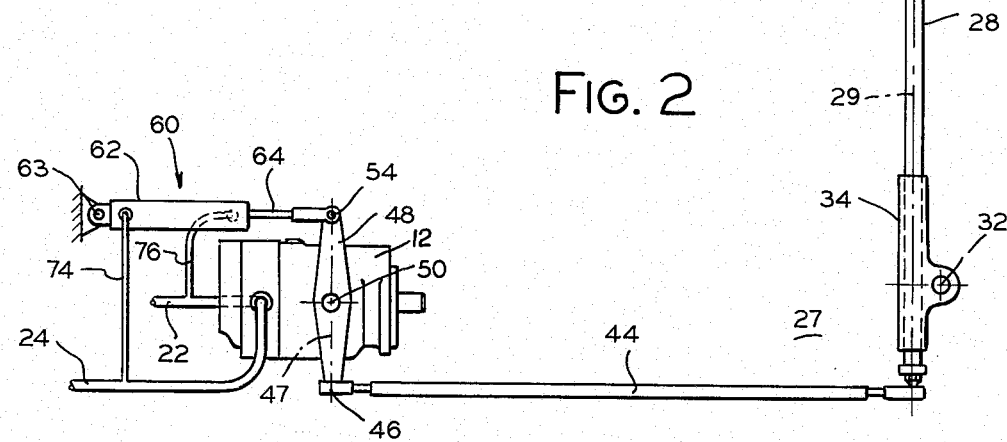
FIG. 2 is a schematic side elevational view of a portion of the apparatus of FIG. 1.
Figure 3:
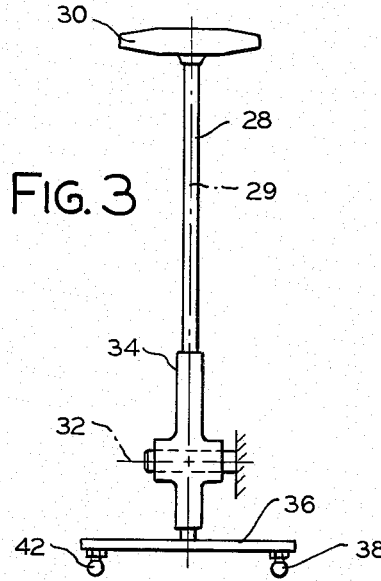
FIG. 3 is a schematic end elevational view of the single control lever of FIG. 2.
Figure 4:
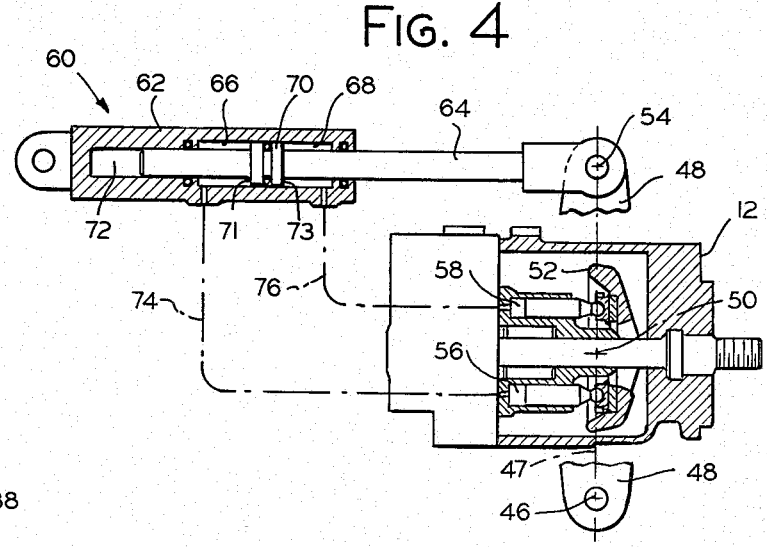
FIG. 4 is a schematic and diagrammatic fragmentary view, partially in section, of a portion of the apparatus of FIG. 2.

FIGS. 2 and 4 illustrate only pump 12 and the associated parts of the control mechanism on one side of centerline 26 but it will be appreciated that these are duplicated on the other side of centerline 26 except reversed in positioned and arrangement, with the operation of the pump and control mechanism on the other side accordingly being the opposite of the following description of pump 12 and the portion of the control mechanism associated with it.

The operating rod 44 has a universal connection at 46 with a bellcrank 48 which pivots about axis 50 and is connected to and moves the swash plate 52 of pump 12 by pivoting it about axis 50 in the desired direction. The pivots 46 and 59 are shown in FIGS. 2 and 4 as is an upper pivot 54 which is explained hereinafter. A plane which intersects all three pivots indicated by line 47 in FIGS. 2 and 4.

If lever 28 is moved clockwise as indicated by the arrow 55 in FIG. 2, pivoting about axis 32, the operating rod 44 causes bellcrank 48 and its swash plate 52 also to pivot clockwise about axis 50. If the control lever 28 is moved in this manner without twisting it about its axis 29, the operating rod 40 causes the swash plate on the other pump 10 to move the same amount in a direction which produces the same result, that is, the two pumps both drive their respective motors in a direction which may be called forward which operates the two wheels connected to the shafts 15 and 17 respectively in the same direction at the same speed.

It will be appreciated by those skilled in the art that such movement of the swash plate 52 produces a pressure rise in one portion of the axial piston pump. This pressurized portion or chamber is indicated generally by the numeral 56, while the suction portion of the pump is indicated at 58. The pressurized portion of the pump under these circumstances is connected by fluid conduit 24 to the motor 16, while the conduit 22 serves as the return conduit for returning fluid to the suction portion 58 of the axial piston pump.

It will be understood that the pressure in chamber 58 of the pump under these circumstances produces forces on the axial pistons in the lower part of the pump which in turn produce a force on the swash plate 52 which urges it counterclockwise. In other words, in the absence of an external force holding it out of its neutral position, shown in FIG. 4, the swash plate 10 returns to neutral.

It will be appreciated that when the lever 28 is moved counterclockwise from the position of FIG. 2, as indicated by the arrow 57, the chamber 58 of the pump is pressurized and chamber 56 is the suction chamber, and as a result of the fluid flow between pump 12 and motor 16 is in the opposite direction and motor 16 consequently operates in the opposite direction. Pump 10 and motor 14 are similar but opposite. Thus, provision is made for both forward and reverse operation of the motors 14 and 16 depending on the direction in which lever 28 is moved from neutral. Because of the length of lever 28 it is not difficult for an operator to overcome the counteracting forces of the swash plates for such forward and reverse operation.

In order to cause the motors 14 and 16 to operate at different speeds or in different directions, it is necessary to pivot the operating rod 28 about axis 29 by "twisting" operating handle 30. If such twisting is carried out at the same time as the lever 28 is moved for either forward or reverse operation of the motors it will be appreciated that one motor will operate at a slower speed than the other, because the rods 40 and 42 will not move the same distance, and this in turn causes a vehicle operated by this transmission to turn. That is, steering is accomplished. If the operating rod 28 is twisted either clockwise or counterclockwise from the position shown in FIG. 1, without pivoting lever 28 about axis 32, one motor turns in one direction and the other motor turns in the other direction, and in a properly constructed vehicle, this produces a pivot turn, that is, the vehicle pivots about a point midway between the wheels connected to the shafts 15 and 17 of the motor.

However, because of the small moment arm available on the handle 30 for the twisting movement of the rod 28, power assist devices have been provided which aid the operator in steering. One of these power assist devices is indicated by the numeral 60 in FIGS. 2 and 4, the power assist device 60 being for pump 12, while a similar power assist device 61 is provided for the pump 10.

FIGS. 2 and 4 show the details of power assist device 60. It comprises a cylinder 62 which is secured to a fixed portion of a vehicle by means of a pivot connection at 63. Within cylinder 62 is an axially reciprocal rod 64 which is pivotally connected at 54 to bellcrank 48. Within cylinder 62 is an enlarged diameter portion which forms a pair of chambers 66 and 68, the intervening piston or land portion 70 on the rod 64 separating the two chambers. It will be appreciated that as the rod 64 moves in and out of cylinder member 62 the volumes of chambers 66 and 68 vary, with chamber 66 becoming smaller as the rod moves inwardly or to the left in FIG. 4 and larger as the rod moves outwardly, while chamber 68 is vice versa. The rod 64 is arranged to extend into an opening 72 at the inner end of the cylinder so that the end surfaces 71 and 73 of chambers 66 and 68 are of the same area and thus produce the same force with the same unit pressure.

As shown schematically in FIG. 2 and diagrammatically in FIG. 4, there is a hydraulic pressure connection 74 between chamber 56 and chamber 66. Similarly, there is another hydraulic pressure connection 76 between chamber 58 and chamber 68. Under some operating conditions chamber 56 is a pressure chamber and chamber 58 is a suction chamber, while under other conditions, chamber 58 is the pressure chamber and chamber 56 is the suction chamber.

When operating lever 28 is moved clockwise to move swash plate 52 clockwise, and produce a pressure in chamber 56, the connection 74 provides for the transmission of such pressure to chamber 66, which acting on the surface 71, provides a force on rod 64 which is additive to the force being applied through operating lever 28 and connecting rod 44. The hydraulic pressure in the pump chamber 56 is producing a counter force which urges the swash plate 52 counterclockwise. It will be appreciated that the power assist device 60 must be proportioned and connected so that its force is less than the restoring force in the pump on swash plate 52. However, it is possible to provide enough force by means of devices 60 to assist the operator so that it is relatively easy to twist the operating rod 28 about its longitudinal axis. In other words, the power assist device assists the operator by supplying the force difference between that applied by the operator and the resisting force of the pump swash plate.

It will be appreciated that by the operation of the control lever in the opposite direction, that is, by pivoting lever 28 counterclockwise about axis 32, the chamber 58 of the pump is pressurized, which in turn pressurizes chamber 68 of the power assist device and accomplishes the same power assist operation in the other direction. In this case, the pressure in chamber 68 acts on surface 73 to assist the operator moving control lever 28 counterclockwise and overcoming the resistance of the pump which under these conditions attempts to move the swash plate of the pump clockwise.

In addition to assisting the operator in operating the hydrostatic drive system in either direction and in accomplishing turning movement the control mechanism described and illustrated herein also provides an automatic dead man brake because in the event the operator removes his hand from the control lever 28 the swash plates of the pumps automatically return to a neutral position which stops operation of the motors and of the vehicle.

While I have described and illustrated herein the best mode contemplated for carrying out my invention in accordance with the statue it will be appreciated that modifications may made, and I intend to cover by the appended claims all such modifications falling within the true spirit and scope of my invention.

It should be understood that some of the terminology employed in the claims is exemplary and is not intended to be limiting. For example, while the operating lever is referred to as vertically disposed, it will be appreciated that it is possible to use the control mechanism of the present invention in positions in which the operator's control lever is not vertically disposed. The operator's lever is referred to as being vertically disposed in order to provide a point of reference for the other parts of the mechanism.

What is claimed is:

1. A control mechanism for a dual path hydrostatic drive system having two variable displacement swash plate type pumps connected individually in circuit with two motors, comprising a single vertically disposed control lever pivotable about a horizontally disposed axis and about a vertically disposed axis, a transverse portion rigidly secured to the said control lever and extending outwardly relative to the said vertically disposed axis, a pair of operating rods connected between the said transverse portion and the swash plates of the respective pumps, and a pair of hydraulic power assist devices mechanically connected respectively to the swash plates, each of said devices having hydraulic connections to the pressure and suction chambers of its respective pump and arranged to apply a force to the swash plate of its respective pump which is additive to the force applied by the respective operating rod when the swash plate is in other than its neutral condition.

2. A control mechanism as in claim 1 in which the said vertically disposed control lever is selectively pivotable about the said horizontally disposed axis only or about the said vertically disposed axis only or about both said axes simultaneously.

3. A control mechanism as in claim 1 in which the said transversely disposed portion is at the bottom of the said control lever and the said connections of the operating rods are on opposite sides of the control lever.

4. A control mechanism as in claim 1 in which the said control lever is rectilinear and the said vertically disposed axis coincides with the longitudinal axis of the control lever.

5. A control mechanism as in claim 1 in which the total of the forces applied to a pump swash plate by its said operating rod and its respective power assist device, when such swash plate is in other than its neutral condition, is equal to the internal force in the pump tending to restore the swash plate to its neutral condition.

6. A control mechanism as in claim 1 in which each of the said hydraulic power assist devices comprises an outer cylinder and an inner rod axially reciprocal therein.

7. A control mechanism as in claim 6 in which each of the said rods is pivotally connected to its respective pump swash plate.

8. A control mechanism as in claim 6 in which the said cylinder includes an inner enlarged diameter portion, and the said rod includes a land portion thereon which cooperates with the said enlarged diameter portion to form a pair of variable volume chambers.

9. A control mechanism as in claim 8 in which the said variable volume chambers in each power assist device are connected respectively to the pressure and suction chambers of its respective pump.

* * * * *